United States Patent
Lu

(10) Patent No.: US 11,425,296 B2
(45) Date of Patent: Aug. 23, 2022

(54) SYSTEM AND METHOD FOR CONTROLLING A NETWORK CAMERA

(71) Applicant: ARRIS Enterprises LLC, Suwannee, GA (US)

(72) Inventor: Echo Lu, Hickory, NC (US)

(73) Assignee: ARRIS ENTERPRISES LLC, Suwanee, GA (US)

( * ) Notice: Subject to any disclaimer, the term of this patent is extended or adjusted under 35 U.S.C. 154(b) by 71 days.

(21) Appl. No.: 17/110,532

(22) Filed: Dec. 3, 2020

(65) Prior Publication Data

US 2021/0203832 A1 Jul. 1, 2021

Related U.S. Application Data

(63) Continuation of application No. PCT/CN2019/130323, filed on Dec. 31, 2019.

(51) Int. Cl.

| | |
|---|---|
| H04N 5/232 | (2006.01) |
| H04N 7/18 | (2006.01) |
| G06F 3/04883 | (2022.01) |
| H04L 65/60 | (2022.01) |
| H04L 67/125 | (2022.01) |

(52) U.S. Cl.
CPC ..... *H04N 5/23206* (2013.01); *G06F 3/04883* (2013.01); *H04L 65/60* (2013.01); *H04L 67/125* (2013.01); *H04N 7/185* (2013.01)

(58) Field of Classification Search
None
See application file for complete search history.

(56) References Cited

U.S. PATENT DOCUMENTS

| | | | |
|---|---|---|---|
| 2012/0262576 A1* | 10/2012 | Sechrist | H04N 21/21805 348/E5.031 |
| 2018/0332004 A1* | 11/2018 | Drako | H04N 7/181 |

FOREIGN PATENT DOCUMENTS

| | | |
|---|---|---|
| CN | 101133651 A | 2/2008 |
| CN | 103297689 A | 9/2013 |
| CN | 105228146 A | 1/2016 |

(Continued)

OTHER PUBLICATIONS

International Search Report and Written Opinion in International Application No. PCT/CN2019/130323, dated Sep. 28, 2020 (9 pages).

(Continued)

*Primary Examiner* — Tuan S Nguyen
(74) *Attorney, Agent, or Firm* — Botos Churchill IP Law LLP

(57) ABSTRACT

A system and method for responsively prohibiting images collected by a networked video camera from being transmitted from a local network to the Internet or other non-local network as a function of the location of identified users. The disclosed technology provides for utilizing a local network to detect the location of one or more identifiable users. The ability of one or more cameras connected to that local network to transmit collected images outside of that local network is then limited as a function of the user identity and location. The system includes an interface enabling a user to define the particular individuals that the system will recognize, the network camera(s) that will be controlled by the system, and the conditions under which access to the Internet by a particular camera will be prohibited.

20 Claims, 5 Drawing Sheets

(56) References Cited

FOREIGN PATENT DOCUMENTS

| | | |
|---|---|---|
| CN | 206149319 U | 5/2017 |
| CN | 206686212 U | 11/2017 |
| CN | 109463297 A | 3/2019 |

OTHER PUBLICATIONS

Cheung, Sen-Ching S., et al., "Managing Privacy Data in Pervasive Camera Networks", 2008 15th IEEE International Conference on Image Processing, Dec. 31, 2008(Dec. 31, 2008).

* cited by examiner

SYSTEM AND METHOD FOR CONTROLLING A NETWORK CAMERA

CROSS REFERENCE TO RELATED APPLICATION

This application is a continuation application of International Application No. PCT/CN2019/130323, filed Dec. 31, 2019, and entitled "SYSTEM AND METHOD FOR CONTROLLING A NETWORK CAMERA", which is hereby incorporated by reference in its entirety.

BACKGROUND OF THE INVENTION

The continued proliferation of inexpensive, high-resolution video cameras capable of being connected to networks in residential environments has led to a situation where privacy has become increasingly difficult to maintain. These cameras are typically connected via Wi-Fi, Ethernet or other local network to the Internet, and are, as a matter of convenience, maintained in an "on" state collecting and transmitting video images at all times. Keeping the cameras in an always on state allows the cameras to employed for security purposes (remotely accessible by the residents or third party, such as a security service). Having one or more cameras in an always on state can also be advantageous for the inception or receipt of video calls.

Networked video cameras can be stand-alone devices, or integrated into other appliances (computer monitors, laptop computers, televisions, telephones, etc.). The use of these video cameras has become so common, that it is not unusual to find one or more of them in and around a private residence or business. Oddly, the pervasive use of these cameras has made them almost invisible to the persons living or working in the particular location where they are installed. The presence of the cameras has become so common-place that they fade into the background of people's perception.

This background effect, coupled with the almost omnipresent nature of video cameras has created environments where users (the residents of the locations where the cameras are installed) fail to be cognizant that their image is being captured and sent out over the Internet by default. This can lead to images of users being transmitted to individuals (or groups of individuals) that the user might not desire receive such. For example, the user or users might be in casual clothing, or in a state of just having woken up from a night's sleep, or in any number of other situations that might require a degree of privacy. A user could opt to manually turn the cameras off, but this would present a cumbersome and burdensome task and be detrimental to the security of the residence if the user failed to place the camera(s) into an on state before departing the residence.

There is a need for a simple, automatic means of disabling and enabling networked cameras from transmitting collected images over the Internet so as to protect the privacy of users without compromising the utility of the cameras for security and video call applications.

BRIEF SUMMARY OF THE INVENTION

A system and method for responsively prohibiting images collected by a networked video camera from being transmitted from a local network to the Internet or other non-local network as a function of the location of identified users. The disclosed technology provides for utilizing a local network to detect the location of one or more identifiable users. The ability of one or more cameras connected to that local network to transmit collected images outside of that local network is then limited as a function of the user identity and location. The system includes an interface enabling a user to define the particular individuals that the system will recognize, the network camera(s) that will be controlled by the system, and the conditions under which access to the Internet by a particular camera will be prohibited.

BRIEF DESCRIPTION OF THE DRAWINGS

The aspects, and advantages of the present invention will become better understood with regard to the following description, appended claims, and accompanying drawings in which:

DETAILED DESCRIPTION

Figure 1:
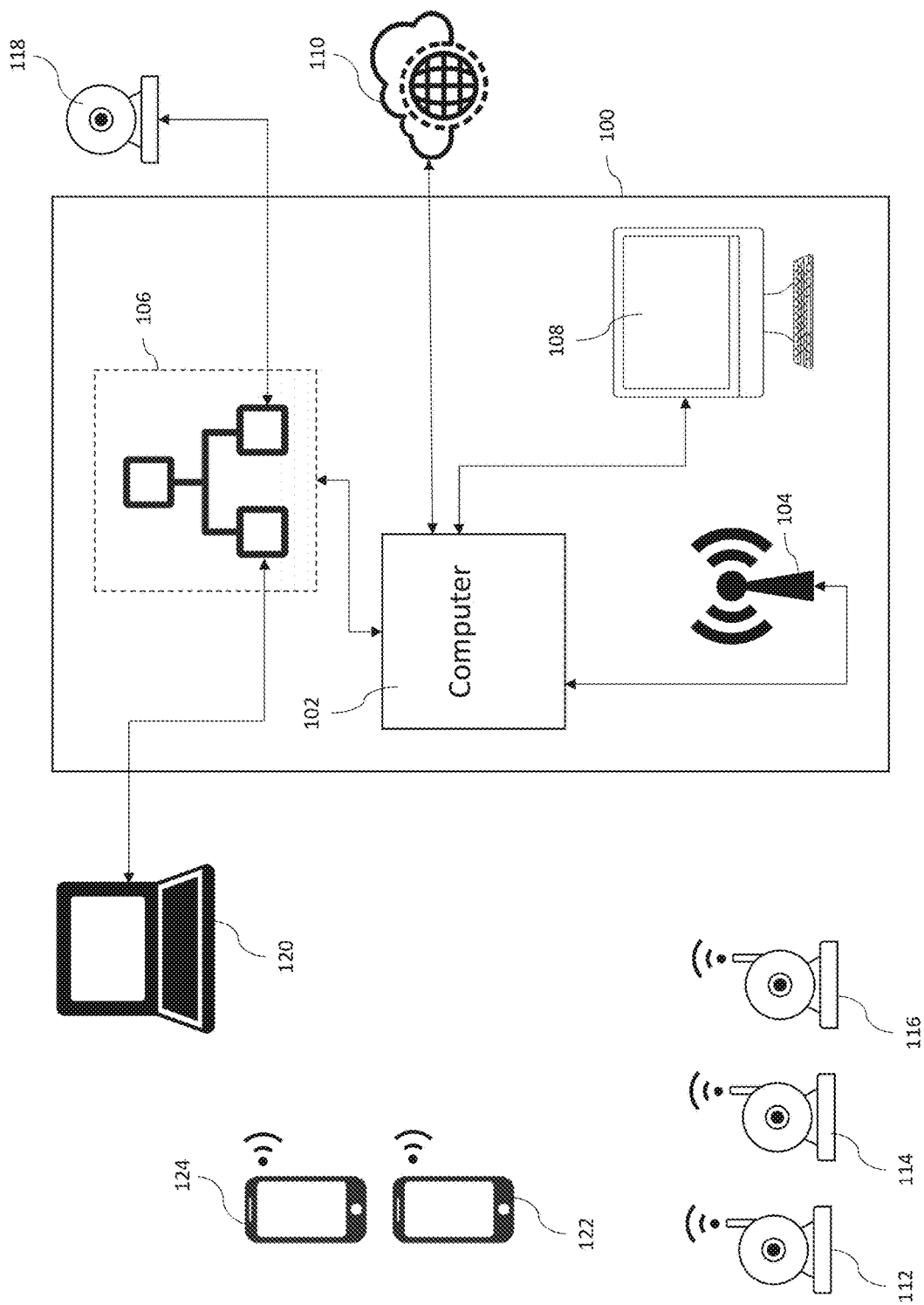
FIG. 1 is a functional diagram of a preferred embodiment of a network camera management system.

FIG. 1 is a functional diagram of a preferred embodiment for a network camera management system. As shown, the system 100 includes computer 102 which serves as the *nexus* for the system. This computer may be a general-purpose personal computer, or a computer interfaced with a server, executing software dedicated to controlling and configuring a network of cameras as described herein. Computer 102 is coupled to Wi-Fi router 104 so as to enable data to be passed between the router and the computer, and to permit the management of router 104 by computer 102. Wired network 106 is also coupled to computer 102 so as to permit data to be passed between the wired network and the computer, and to enable the management of wired network 106 by computer 102. Wired network 106 can include local area networks that adhere to any one of a number of known network standards, such as Ethernet. User interface 108 is coupled to computer 102 and is utilized to control and configure the network camera management system. This user interface can be a standard monitor and keyboard, a touch screen, or a smartphone or other mobile device running an application adapted to instruct computer 102 to control and configure the network camera management system. The connection between user interface 108 and computer 102 may be wired or wireless. Computer 102 is also shown to be bidirectionally linked with a public network 110. This public network could be the Internet or any other network outside of the local network supported by wireless router 104 and wired network 106.

In addition, FIG. 1 shows user devices and peripheral devices connected to and in communication with network camera management system 100. These include wireless video cameras 112, 114 and 116 that are connected to computer 102 via Wi-Fi router 104 and wired video camera 118 that is connected to computer 102 via wired network 106. All of the video cameras (112-118) are in a default "on" state (collecting video images) and computer 102 by default transmits the image data from each of these cameras to one or more recipients via public network 110. The transmission of the collected video data could be for the purpose of having a third party or external system monitor the collected images for purposes such as environmental monitoring or security. Laptop 120 (a user device) is also connected to computer 102 via wired network 106. In addition, FIG. 1 shows mobile user devices 122 and 124, which are connected to computer 102 via Wi-Fi router 104.

Figure 2:
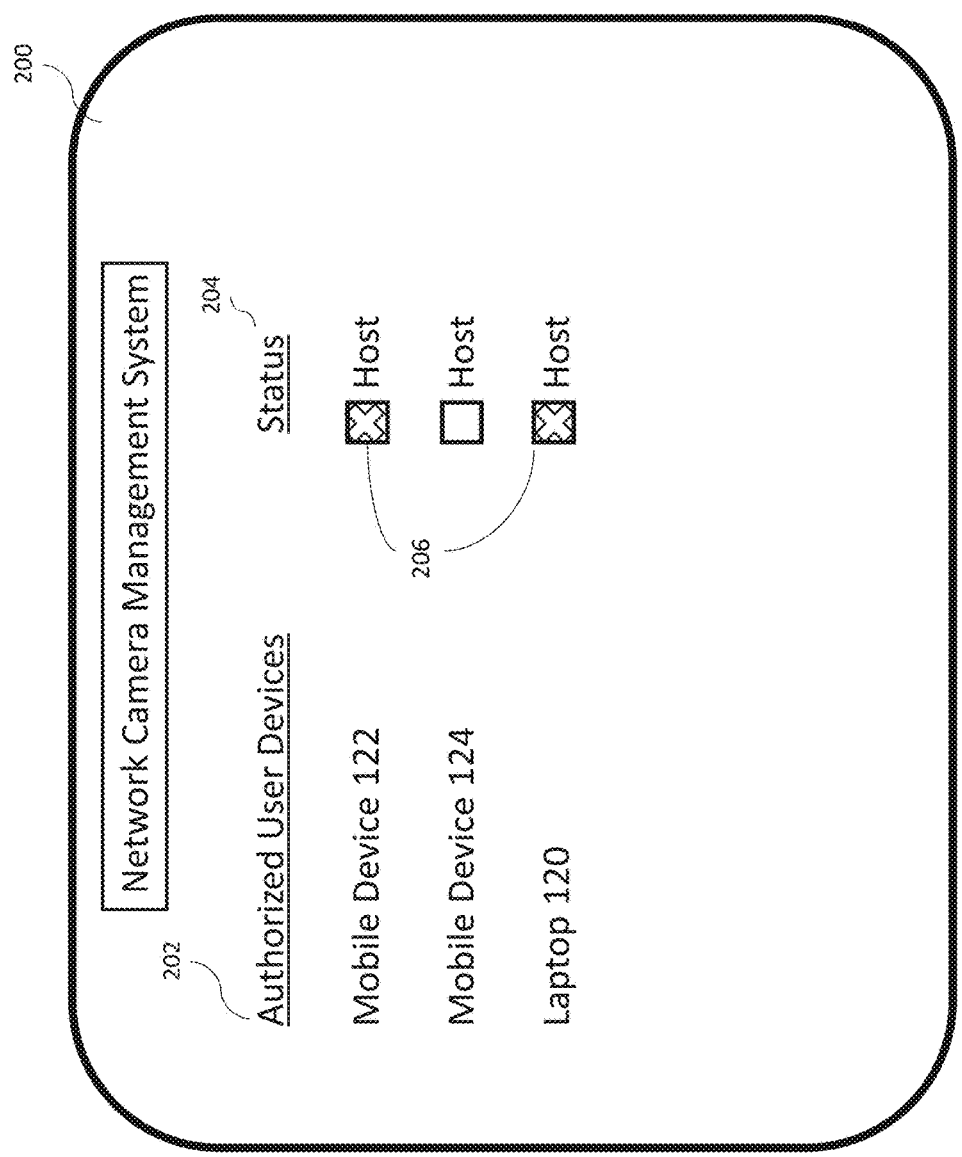
FIG. 2 is a diagram of a user interface screen adapted for the control of authorized user devices within the network camera management system of FIG. 1.

The operation of the network camera management system is controlled via user interface 108. FIG. 2 depicts a control screen for such that would be employed to control the embodiment of the system of FIG. 1 As shown, screen 200 provides the user with a listing (202) of the user devices currently identified as "authorized" within the management system: mobile device 112, mobile device 114 and laptop 120. The screen also shows the status of each authorized user device (204). This status indicates if each user device has been identified by the user as a host user device. A host user device is a user device that is recognized as being in the possession or under the control of a member of the household or business in which the management system is installed. For example, in a residential setting, host user devices would likely include the mobile telephones, smartphones, wearable smart devices and/or laptops of the family members residing in the residence. As shown in FIG. 2, mobile user device 112 and laptop 120 have been identified (206) as host user devices. A user would click on the appropriate box using a pointing device to affect such a user device designation.

Figure 3:
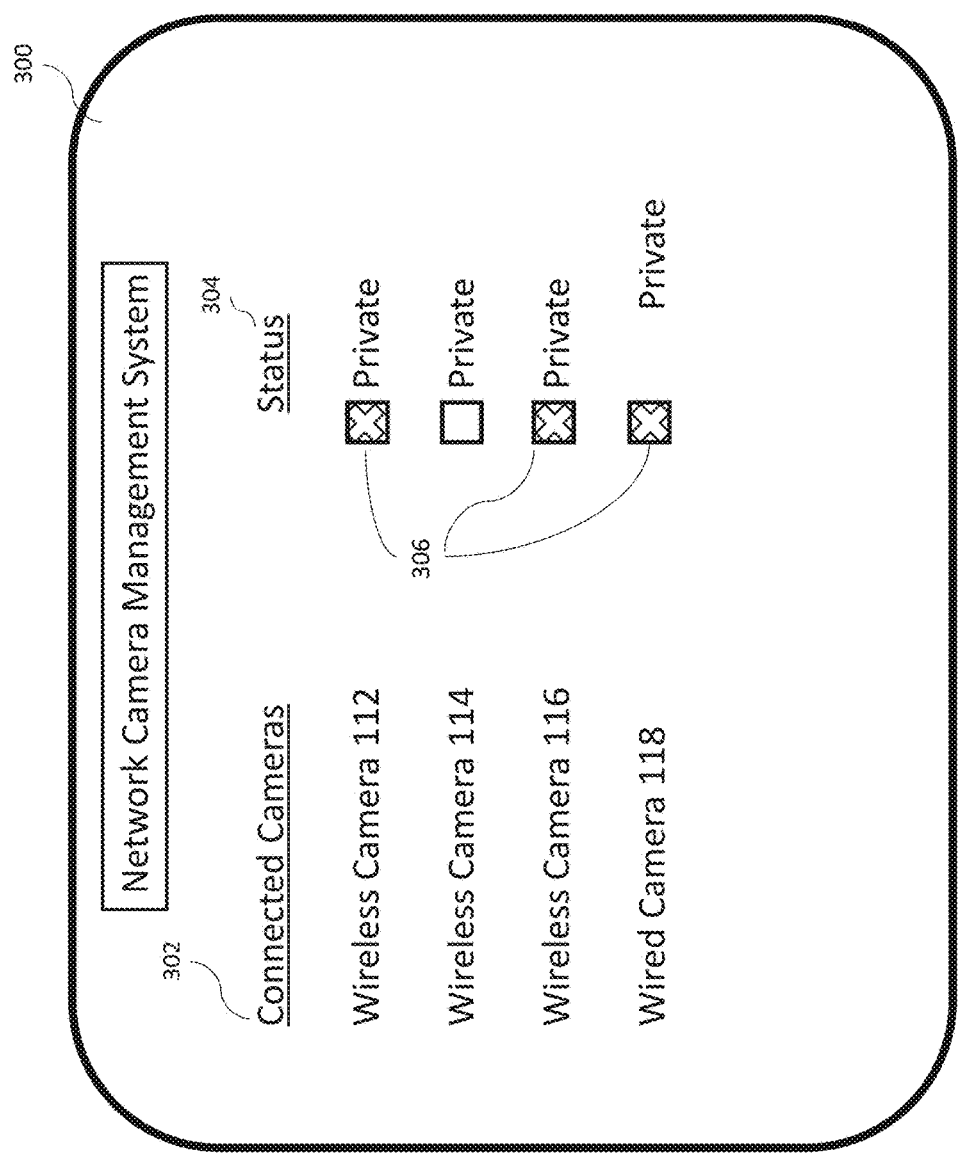
FIG. 3 is a diagram of a user interface screen adapted for the control of connected cameras within the network camera management system of FIG. 1.

FIG. 3 depicts a network camera management system control screen 300 that provides the user with a listing (302) of the cameras presently connected to the local network. As shown, these include wireless cameras 112-116 and wired camera 118. Screen 300 also shows the status (304) of each connected camera. The camera status indicates which of the cameras has been identified by the user as a private camera. When certain a particular condition or conditions are determined by the system to have been met, video images collected by a private camera will be prohibited from being transmitted via public network 110. Images collected by any cameras which have not been identified as private will be permitted to be transmitted via public network 110, regardless of any determination that a particular condition or conditions have been satisfied. Screen 300 indicates that cameras 112, 114 and 118 have been designated as private by a user (306). As with screen 200, a user clicks on the appropriate box using a pointing device to affect such a camera designation.

A user can add and remove user devices from the list of authorized user devices as needed. Typically, the ability to add or delete authorized user devices, as well as the ability to designate user devices as hosts and cameras as private would be limited to certain privileged users and protected by a password, parental code, or other means of verification.

Following the designation of user devices and cameras by a user, the network camera management system monitors the local network supported by Wi-Fi router 104 and wired network 106. If an authorized user device that has been designated a host user device connects to the local network, computer 102 responds by terminating the feed of video images collected by any private network camera that may have been being transmitted over public network 110. Computer 102 will continue to prohibit the transmission of any such video images over public network 110 as long as at least one host user device is connected to the local network. Video images collected by camera 114 will continue to be transmitted via public network 110, as this camera was not designated as private, and is therefore considered to a public camera and the video collected thereby authorized for transmission via public network 110.

If an unauthorized device were to connect to the local network during a period when no authorized host user devices were similarly connected, the transmission of video images collected by all network cameras would continue to be transmitted via public network 110 until a host user device connected to the local network.

Figure 4:
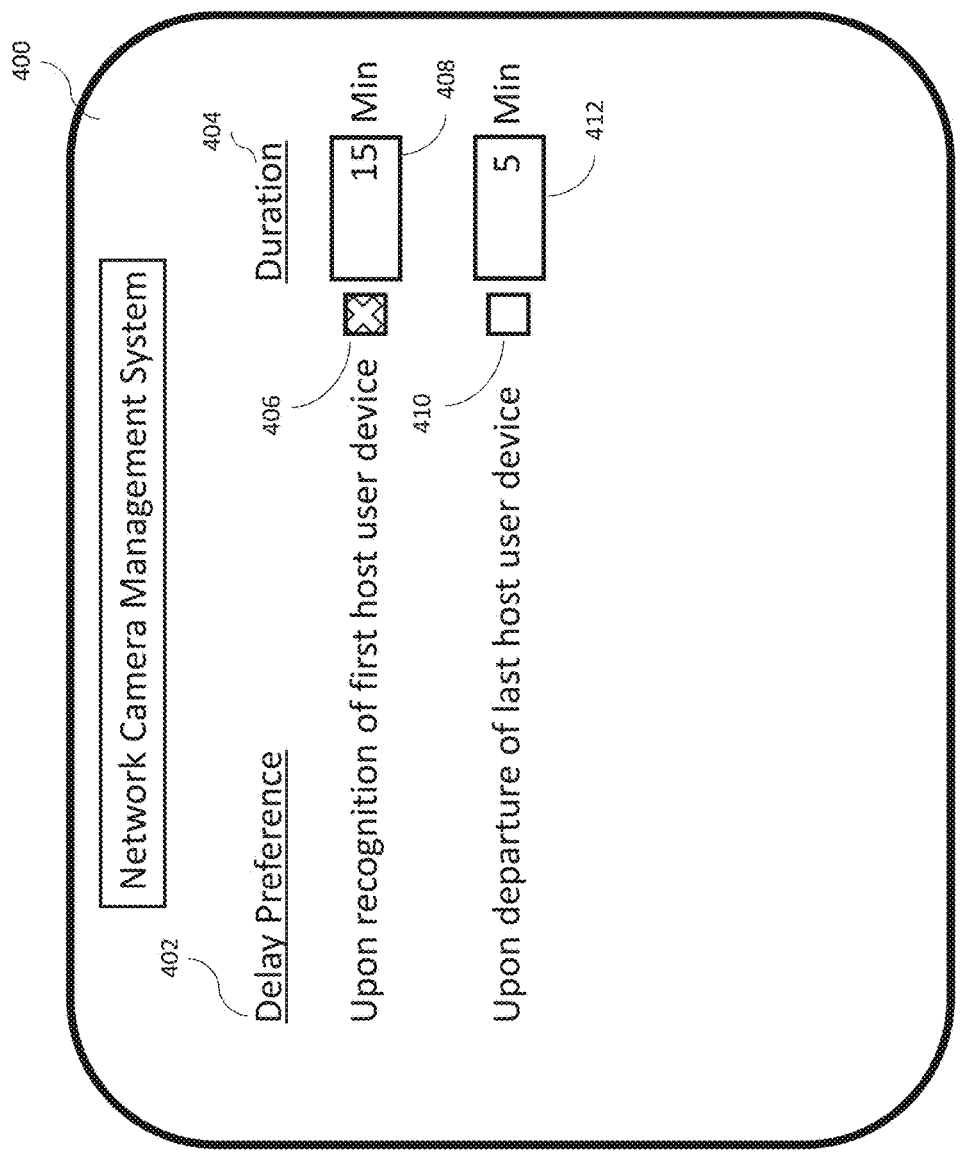
FIG. 4 is a diagram of a user interface screen adapted for the control of delays within the network camera management system of FIG. 1.

In addition, the network camera management system can be configured to apply certain rules to further govern the transmission of collected images over public network 110. As shown in FIG. 4, the user interface 108 provides a screen 400 wherein a user can specify if certain delays (402) should be in effect and the duration (404) of those delays. If a user were to click on box 406 using a pointing device, the management system would delay prohibiting video images collected by private cameras from transmission via public network 110 until a user-specified period had elapsed after the first host user device connected to the local network. The duration of this period would be entered by the user in box 408. The user could also specify that the system should impose delay before permitting the transmission of private camera video images to be transmitted via public network 110 after the last host user device has disconnected from the local network. To enable such a delay a user would click on box 410 and enter the desired delay duration in box 412.

Additional screens could also be configured and the system adapted to permit/prohibit the transmission of collected private camera video images over public network 110 as a function of the time of day, day of the week, date, etc.

Figure 5:
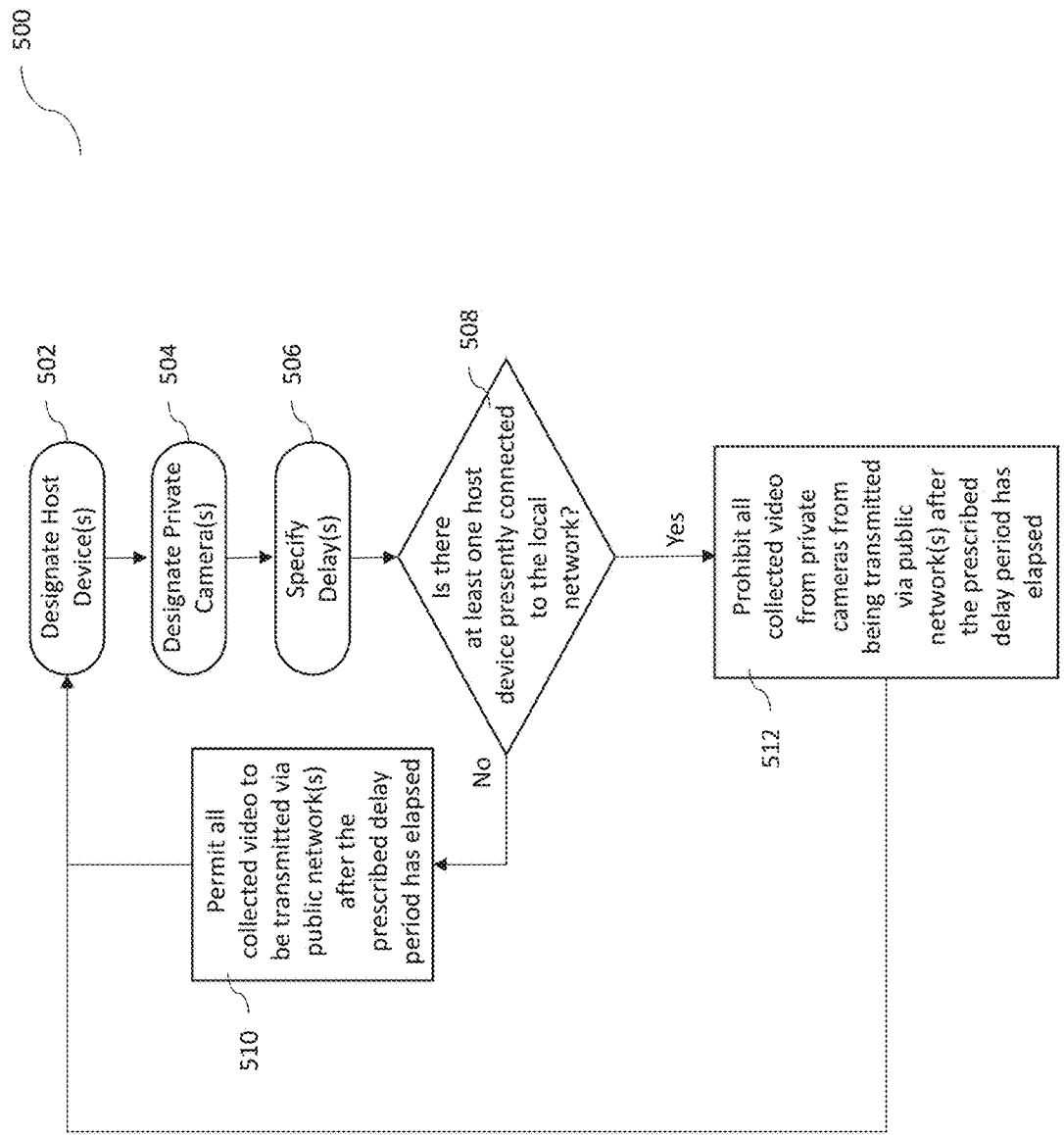
FIG. 5 is a flow diagram of operational steps executed within the system of FIG. 1.

A preferred method and process (500) for implementation within the system of FIG. 1 is illustrated in FIG. 5. As shown, after a user designates at least one host user device (502), designates at least one camera as private (504), and specifies any delays that the system should impose (506), the management system determines if there are any host user devices connected to the local network (508). If the system determines that there are no host user devices presently connected to the local network, all video data collected by network cameras will be permitted to be transmitted over public networks (510), after the prescribed delay period (if any) has elapsed. The process then continues with steps 502, 504 and 508, enabling the system to check if user device designations, camera statuses, or delay preferences have been changed by a user.

If the determination is made at step 508 that at least one host user device has connected to the local network, then the management system will prohibit any video data collected by private network cameras from being transmitted over public networks (512), after the prescribed delay period (if any) has elapsed. The process then continues with steps 502, 504 and 508, enabling the system to check if user device designations, camera statuses, or delay preferences have been changed by a user.

The disclosed invention offers many advantages, including the ability to automatically prohibit the transmission of video images collected by cameras designated as private without repeated user intervention. It also provides a simple interface enabling users to quickly and easily configure the network camera management system. In addition, the disclosed system is flexible, being limited only by the capacity of the local network associated with the controlling computer/server. Although the invention herein has been described with reference to particular embodiments, it is to be understood that these embodiments are merely illustrative of the principles and applications of the present invention. In addition, various functional aspects of the invention could be implemented via physical arrangements that might have varying degrees of integration. The entirety of the disclosed invention could be implemented within a monolithic system, or disparate discrete components without departing from the spirit and scope of the present invention as defined by the appended claims.

The invention claimed is:

1. A camera management system comprising:
   at least one local network;
   at least one public network;
   at least one camera connected to the local network and adapted to be switchably designated as private or public;
   at least one user device adapted to connect with the local network and be switchably designated as host or non-host; and
   a controller adapted to:
      determine that at least one user device is connected to the local network;
      determine whether the at least one user device has been designated as a host user device;
      prohibit all cameras designated as private cameras from transmitting collected video images from the at least one local network to the least one public network, based upon at least the determination that the at least one user device has been designated as a host user device; and
      enable all cameras to transmit video collected images from the at least one local network to the least one public network, based upon at least the determination that no user device has been designated as a host user device.

2. The system of claim 1 wherein the at least one user device comprises at least one of:
   a personal computer;
   a mobile device;
   a wearable device; and
   a smart phone.

3. The system of claim 1 wherein the at least one public network comprises the Internet.

4. The system of claim 1 wherein the at least one private network comprises at least one of:
   a Wi-Fi network; and
   an Ethernet network.

5. The system of claim 1 further comprising a user interface adapted to enable a user to switch the designation of at least one of:
   the at least one camera between public and private; and
   the at least one user device between host and non-host.

6. The system of claim 5 wherein the user interface comprises at least one of:
   a personal computer;
   a touch screen; and
   a mobile device.

7. The system of claim 1 wherein the controller is further adapted to impose a delay from the time a user device designated as a host user device is detected to be connected to the local network and the time at which video images collected by cameras designated as private cameras are prohibited from transmission from the at least one local network to the at least one public network.

8. The system of claim 7 wherein the delay is user-specified.

9. The system of claim 1 wherein the controller is further adapted to impose a delay from the time at which there are no user devices designated as a host user device detected to be connected to the local network and the time at which video images collected by all cameras are permitted to be transmitted from the at least one local network to the least one public network.

10. The system of claim 9 wherein the delay is user-specified.

11. In a camera system comprising at least one camera that can be designated a private or a public camera, a method of managing the camera system comprising the steps of:
   detecting at least one user device is connected to at least one local network;
   determining whether the at least one user device is designated as a host user device;
   enabling all cameras to transmit collected video images from the at least one local network to at least one public network, based upon at least the determination that no user device has been designated as a host user device; and
   prohibit all cameras designated as a private cameras from transmitting collected video images from the at least one local network to the at least one public network, based upon at least the determination that at least one user device has been designated as a host user device.

12. The method of claim 11 wherein the at least one user device comprises at least one of:
   a personal computer;
   a mobile device;
   a wearable device; and
   a smart phone.

13. The method of claim 11 wherein the at least one public network comprises the Internet.

14. The method of claim 11 wherein the at least one private network comprises at least one of:
   a Wi-Fi network; and
   an Ethernet network.

15. The method of claim 11 further comprising the step switching the designation of at least one of the following in response to information received from a user interface:
   the at least one camera between public and private; and
   the at least one user device between host and non-host.

16. The method of claim 15 wherein the user interface comprises at least one of:
   a personal computer;
   a touch screen; and
   a mobile device.

17. The method of claim 11 further comprising the step of imposing a delay from the time a user device designated as a host user device is detected to be connected to the local network and the time at which video images collected by cameras designated as private cameras are prohibited from transmission from the at least one local network to the at least one public network.

18. The method of claim 17 wherein the delay is user-specified.

19. The method of claim 11 wherein, if the at least one camera has been designated a private camera, a delay is imposed from the time at which there are no user devices designated as a host user device detected to be connected to the local network and the time at which video images collected by all cameras are permitted to be transmitted from the local network to the least one public network.

20. The method of claim 19 wherein the delay is user-specified.

* * * * *